United States Patent [19]
Bito et al.

[11] Patent Number: 5,194,342
[45] Date of Patent: Mar. 16, 1993

[54] SOLID-STATE VOLTAGE STORAGE CELL

[75] Inventors: Yasuhiko Bito, Yao; Shuji Ito, Kadoma; Kanji Takata, Neyagawa; Shigeko Takahashi, Nara; Yoshinori Toyoguchi, Yao, all of Japan

[73] Assignee: Matsushita Electric Industrial Co., Ltd., Osaka, Japan

[21] Appl. No.: 706,815

[22] Filed: May 29, 1991

[30] Foreign Application Priority Data

May 29, 1990 [JP] Japan .................................. 2-141052

[51] Int. Cl.⁵ .......................... H01M 4/54; H01M 6/18
[52] U.S. Cl. ...................................... 429/191; 429/193; 429/219
[58] Field of Search ........................ 429/191, 193, 219

[56] References Cited

U.S. PATENT DOCUMENTS

3,342,640  9/1967  Herold et al. ...................... 423/600
4,830,940  5/1989  Keister et al. ...................... 429/219
4,965,151 10/1990  Takada et al. ...................... 429/219

Primary Examiner—Wayne Langel
Attorney, Agent, or Firm—Panitch Schwarze Jacobs & Nadel

[57] ABSTRACT

A solid-state voltage storage cell is provided which includes a pair of electrodes and a silver-ion conductive solid electrolyte layer disposed therebetween, wherein each of the electrodes is composed of a composition comprising a silver-ion conductive solid electrolyte, a compound oxide of the formula $Ag_xV_2O_5$ ($0.6 \leq x \leq 0.8$) as an electrode active material, and an electron conductive material which is electrochemically inactive with the compound oxide.

4 Claims, 8 Drawing Sheets

SOLID-STATE VOLTAGE STORAGE CELL

BACKGROUND OF THE INVENTION

1. Field of the Invention

This invention relates to an electrochemical cell such as a solid-state voltage storage cell using a solid electrolyte, and more particularly, it relates to a solid-state voltage storage cell having excellent high-rate voltage storage characteristics.

2. Description of the Prior Art

In recent years, electrochemical cells using a liquid electrolyte, such as batteries and capacitors, have been widely used. However, such conventional electrochemical cells have a disadvantage in that leakage of the liquid electrolyte or gas generation may occur, and there is a possibility of causing the expansion or rupture of the cells. This introduces a serious problem in that the greatest reliability can never be ensured on the use of such electrochemical cells in electric or electronic apparatus.

To eliminate this problem, solid-state electrochemical cells have been developed which employ a solid electrolyte. In such a solid-state electrochemical cell, there arises no problem such as mentioned above, nor other problems associated with a liquid electrolyte, such as freezing or evaporation of the electrolyte. Therefore, solid-state electrochemical cells using a solid electrolyte can be used over a wide range of temperatures, and can also assure high reliability in the use for electric or electronic apparatus.

For this reason, many attempts have been made to develop solid-state electrochemical cells using a solid electrolyte in place of a liquid electrolyte. In particular, intensive work has been done to develop a solid-state battery using a solid electrolyte. Examples of the solid-state batteries which have been hitherto developed include solid-state secondary batteries using any one of the copper-ion conductive solid electrolyte, silver-ion conductive solid electrolyte, and lithiumion conductive solid electrolyte.

There has also been proposed a solid-state voltage storage cell using a solid electrolyte with extremely small self-discharge. For example, a solid-state voltage storage cell has been developed which includes $Ag_2Se$-$Ag_3PO_4$ or silver-vanadium compound oxide as an electrode active material and also includes, as a silver-ion conductive solid electrolyte, $4AgI$-$Ag_2WO_4$ which is stable against water, oxygen and heat, and also has extremely small electron conductivity even at high temperatures. The solid-state voltage storage cell including $Ag_2Se$-$Ag_3PO_4$ as an electrode active material has been put into practical use.

Figure 1:
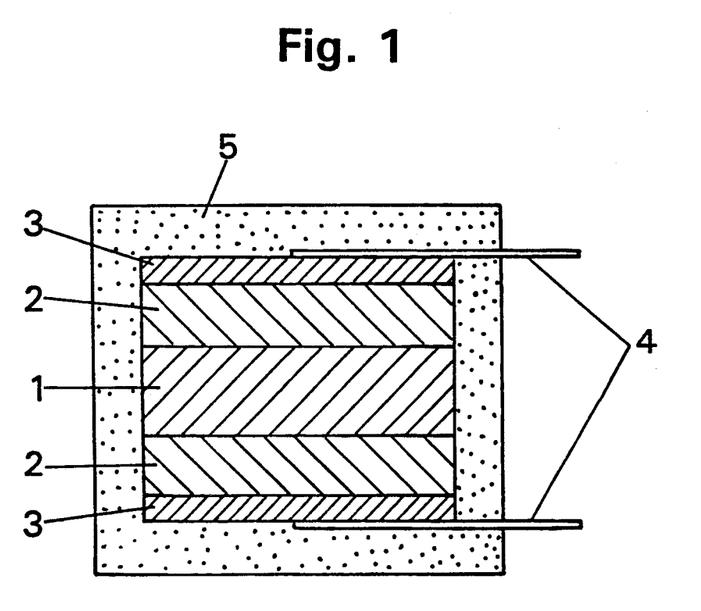
FIG. 1 is a sectional view showing a typical solid-state voltage storage cell.

FIG. 1 shows a solid-state voltage storage cell such as mentioned above. The voltage storage cell comprises a silver-ion conductive solid electrolyte layer 1, and a pair of electrodes 2 disposed so as to interpose the solid electrolyte layer 1. With the use of a carbon paste layer 3, a terminal lead 4 is attached to the major surface of each electrode 2, and the whole surface is coated with a resin 5, except that each terminal lead 4 is left out of the resin coating.

A conventional solid-state voltage storage cell where $Ag_2Se$-$Ag_3PO_4$ is used in the electrode 2 of the above-described configuration has a disadvantage of storing a voltage only in the narrow range of 0 to 100 mV.

On the other hand, a conventional voltage storage cell where a silver-vanadium compound oxide is used in the electrode 2 can store a voltage in the wider range of 0 to 200 mV, as compared with the conventional voltage storage cell mentioned above. Moreover, as described above, the solid electrolyte used together with this electrode active material is stable against water, oxygen and heat, and has almost no electron conductivity even at high temperatures, so that the voltage storage cell including the silver-vanadium compound oxide as the electrode active material can be used over a wide range of temperatures, e.g., even at temperatures exceeding 100° C.

With the configuration in which the solid electrolyte layer is interposed between the electrodes formed from a mixture of the electron active material and the solid electrolyte, however, the solid-state voltage storage cell has high internal resistance and therefore has low voltage-storing rate (in other words, low charging and discharging rates) because of poor electron conductivity of the electrode active material. In particular, when charged and discharged for a short period of time, the voltage stored in the solid-state voltage storage cell has a tendency to deviate from a given level, thereby making it difficult to obtain a satisfactory response to input signals.

SUMMARY OF THE INVENTION

The solid-state voltage storage cell of this invention, which overcomes the above-discussed and numerous other disadvantages and deficiencies of the prior art, comprises a pair of electrodes and a silver-ion conductive solid electrolyte layer disposed therebetween, wherein each of the electrodes is composed of a composition comprising a silver-ion conductive solid electrolyte, a compound oxide of the formula $Ag_xV_2O_5$ ($0.6 \leq x \leq 8$) as an electrode active material, and an electron conductive material which is electrochemically inactive with the compound oxide.

In a preferred embodiment, the aforementioned silver-ion conductive solid electrolyte is $4AgI$-$Ag_2W_4$. The weight ratio of the compound oxide to the solid electrolyte is preferably within the range of 1:1 to 9.

In a preferred embodiment, the aforementioned electron conductive material is at least one selected from the group consisting of graphite fibers and graphite scales.

In a more preferred embodiment, the graphite fibers have a mean diameter in the range of 0.1 to 0.5 μm, and have a mean length in the range of 2 to 30 μm. The content of graphite fibers in each of the electrodes is preferably within the range of 1 to 5 percent by weight based on the total weight of the electrode.

In a more preferred embodiment, the graphite scales have a mean diameter in the range of 1 to 15 μm. The content of graphite scales in each of the electrodes is preferably within the range of 1 to 5 percent by weight based on the total weight of the electrode.

Thus, the invention described herein makes possible the objective of providing a solid-state voltage storage cell which is excellent in quick charging and discharging characteristics.

BRIEF DESCRIPTION OF THE DRAWINGS

This invention may be better understood and its numerous objects and advantages will become apparent to those skilled in the art by reference to the accompanying drawings as follows.

DETAILED DESCRIPTION OF THE INVENTION

The solid-state voltage storage cell of this invention has a pair of electrodes and a silver-ion conductive solid electrolyte layer interposed therebetween. Each of the electrodes is composed of a composition comprising a silver-ion conductive solid electrolyte, a compound oxide of the formula $Ag_xV_2O_5$ ($0.6 \leq x \leq 0.8$) as an electrode active material, and graphite fibers or scales which are electrochemically inactive with the compound oxide.

In a solid-state voltage storage cell with such a structure, electrochemical reaction, i.e., intercalation or deintercalation of silver ions, arises at the interface between the electrode active material in the electrodes and the silver-ion conductive solid electrolyte layer. During this reaction, transfer of electrons occurs within the electrodes. The electrode reaction associated with the electron transfer greatly depends on the electron conductivity of the electrodes. The solid electrolyte used in such a voltage storage cell should have extremely small electron conductivity and it should be a substantially electronically insulating material. The conduction of electrons in the electrodes is carried out only by the silver-vanadium compound oxide.

However, the silver-vanadium compound oxide $Ag_xV_2O_5$ used as an electrode active material in the electrodes has a high volume resistivity of $10 \, \Omega \cdot cm$ and it has therefore low electron conductivity. This makes it impossible for the solid-state voltage storage cell make any satisfactory response to input signals when the voltage storage cell is required to store voltage in a short period of time.

In the solid-state voltage storage cell of this invention, the electrodes also contain graphite fibers or scales, which are eletrochemically inactive with $Ag_x$-$V_2O_5$ and function as electron conductive materials. Accordingly, it is possible to improve the electron conductivity of the electrodes. In particular, the use of graphite fibers can provide a solid-state voltage storage cell having excellent quick charging and discharging characteristics.

DESCRIPTION OF THE PREFERRED EMBODIMENTS

The invention will be further illustrated by reference to the following examples.

EXAMPLE 1

First, AgI, $Ag_2O$, and $WO_3$ were weighed at a mole ratio of 4:1:1, and mixed in a mortar with the use of an alumina pestle. The mixture was then formed into pellets by the application of pressure. These pellets were put into a Pyrex tube which was then sealed at reduced pressure. The tube was heated at 400° C. for 17 hours, so that the mixture in the form of pellets was melted and allowed to react. The reaction mixture was ground in a mortar with a pestle, and sized into 200 mesh or finer, resulting in a powder of silver-ion conductive solid electrolyte of the formula $4AgI \cdot Ag_2W_4$.

Next, vanadium oxide of the formula $V_2O_5$ and metal silver powder were weighed at a mole ratio of 1:0.7, and mixed in a mortar. The mixture was formed into pellets by the application of pressure, and then put into a quartz tube. The quartz tube was sealed at reduced pressure, and then heated at 600° C. for 48 hours, so that the mixture in the form of pellets was allowed to react. The reaction mixture was ground in a mortar, and sized into 200 mesh or finer, resulting in silver-vanadium compound oxide of the formula $Ag_{0.7}V_2O_5$ to be used as an electrode active material powder.

Using the solid electrolyte and the electrode active material thus prepared, solid-state voltage storage cells were produced as follows.

First, the electrode active material and the solid electrolyte were mixed at a weight ratio of 3:7. Then, 1.5 percent by weight of graphite in the form of fibers was added to the mixture, and mixed until the whole mixture became uniform, resulting in an electrode material. The graphite fibers were electrochemically inactive with $Ag_{0.7}V_2O_5$. In this example, various electrode materials were prepared by the addition of graphite fibers with different mean diameters and different mean lengths as listed in Tables 1 and 2 below.

Next, 25 mg of each electrode material thus obtained was weighed and formed into an electrode pellet of 7 mm in diameter by the application of 4 tons/cm² pressure. Two such electrode pellets were used for the production of a solid-state voltage storage cell. Then, 150 mg of the solid electrolyte also in the form of a pellet was disposed between the two electrode pellets, and the whole was formed into a pellet of 7 mm in diameter by the application of 4 tons/cm² pressure, resulting in a solid-state voltage storage cell.

For the evaluation of quick charging and discharging characteristics of the various solid-state voltage storage cells produced above, two tin-plated copper leads were respectively attached to the two electrodes of each voltage storage cell by the use of carbon paste, and then the whole was sealed by the application of an epoxy resin powder coating at a temperature of 150° C.

For the purpose of comparison, a conventional solid-state voltage storage cell was produced in the same manner as described above, except that no graphite fibers were added to the electrode material.

The quick charging characteristics of the solid-state voltage storage cells were evaluated as follows.

A voltage of 200 mV was applied to each solid-state voltage storage cell for 10 seconds at a temperature of 20° C. without using any protective resistor. Then, the solid-state voltage storage cell was maintained under the condition of an open circuit for 2 hours, which was the time required for the voltage of the cell to become substantially stable. After 2 hours passed, the terminal voltage of the cell was measured. The ratio of the cell voltage decrease to the charging voltage was defined as "voltage decrease rate", which was used as an index for the evaluation of the quick charging characteristics of the solid-state voltage storage cell.

Because a solid-state voltage storage cell is actually required to store a voltage output from various electronic apparatus or sensors for at least 10 seconds, the evaluation of the quick charging characteristics was conducted by charging the cell for 10 seconds as described above.

The quick discharging characteristics of the solid-state voltage storage cells were evaluated as follows.

First, a voltage of 200 mV was applied to each solid-state voltage storage cell for 20 hours at a temperature of 20° C. without using any protective resistor. Thereafter, the cell was discharged for 10 seconds with a discharging resistor of 0 Ω (i.e., with the cell terminals being short-circuited). After discharge, the voltage storage cell was maintained under the condition of an open circuit for 2 hours, which was the time required for the voltage of the cell to become substantially stable. After 2 hours passed, the terminal voltage was measured. The ratio of this cell voltage to the charging voltage was defined as the "voltage increase rate", which was used as an index for the evaluation of the quick discharging characteristics of the solid-state voltage storage cell.

The results of the evaluation of the quick charging characteristics of all the solid-state voltage storage cells (i.e., voltage decrease rates) are shown in Table 1, while the results of the evaluation of the quick discharging characteristics thereof (i.e., voltage increase rates) are shown in Table 2. The characteristics of the conventional voltage storage cell produced for comparison were also evaluated in the same manner as those of the voltage storage cells of this example. Each value listed in Tables 1 and 2 is the average of the voltage increase or decrease rates of fifty solid-state voltage storage cells produced with use of the same electrode materials (i.e., the electrode materials containing graphite fibers of the same mean diameter and length).

TABLE 1

| | | Voltage decrease rate after two hours (%) | | | | | | |
|---|---|---|---|---|---|---|---|---|
| | | Mean fiber diameter ($\mu$m) | | | | | | |
| | | 0.05 | 0.1 | 0.2 | 0.3 | 0.4 | 0.5 | 0.6 |
| Mean fiber length ($\mu$m) | 1.0 | 45.5 | 46.2 | 46.4 | 47.6 | 47.5 | 48.1 | 50.4 |
| | 2.0 | 44.2 | 24.0 | 24.5 | 25.5 | 26.1 | 27.0 | 49.3 |
| | 3.0 | 44.4 | 22.5 | 22.0 | 23.5 | 24.3 | 26.2 | 49.5 |
| | 5.0 | 43.0 | 21.0 | 21.5 | 21.0 | 23.2 | 26.0 | 50.0 |
| | 7.0 | 44.5 | 22.2 | 23.0 | 24.5 | 25.5 | 26.1 | 51.2 |
| | 10.0 | 46.1 | 25.0 | 25.6 | 26.0 | 27.0 | 26.6 | 49.9 |
| | 15.0 | 46.3 | 26.5 | 25.4 | 26.4 | 27.4 | 28.1 | 52.0 |

TABLE 1-continued

| | | Voltage decrease rate after two hours (%) | | | | | | |
|---|---|---|---|---|---|---|---|---|
| | | Mean fiber diameter ($\mu$m) | | | | | | |
| | | 0.05 | 0.1 | 0.2 | 0.3 | 0.4 | 0.5 | 0.6 |
| | 20.0 | 47.5 | 28.0 | 27.5 | 27.0 | 28.3 | 28.5 | 51.6 |
| | 30.0 | 48.0 | 29.8 | 28.6 | 29.2 | 28.2 | 29.9 | 51.2 |
| | 35.0 | 51.1 | 50.4 | 51.6 | 52.2 | 52.5 | 54.6 | 55.0 |
| Without graphite | | | | | 92.5 | | | |

TABLE 2

| | | Voltage decrease rate after two hours (%) | | | | | | |
|---|---|---|---|---|---|---|---|---|
| | | Mean fiber diameter ($\mu$m) | | | | | | |
| | | 0.05 | 0.1 | 0.2 | 0.3 | 0.4 | 0.5 | 0.6 |
| Mean fiber length ($\mu$m) | 1.0 | 43.2 | 46.3 | 45.8 | 47.4 | 47.6 | 48.1 | 50.0 |
| | 2.0 | 43.6 | 23.7 | 24.5 | 25.9 | 26.2 | 27.2 | 49.1 |
| | 3.0 | 44.1 | 22.1 | 22.2 | 23.8 | 23.4 | 26.0 | 49.3 |
| | 5.0 | 43.9 | 21.3 | 21.6 | 21.0 | 22.0 | 26.3 | 50.5 |
| | 7.0 | 44.0 | 22.0 | 22.7 | 24.7 | 24.5 | 26.1 | 51.4 |
| | 10.0 | 45.5 | 24.7 | 25.6 | 26.2 | 28.1 | 26.7 | 49.0 |
| | 15.0 | 45.8 | 26.1 | 25.8 | 26.0 | 27.9 | 27.6 | 51.9 |
| | 20.0 | 47.9 | 27.6 | 27.4 | 27.6 | 28.1 | 29.0 | 51.1 |
| | 30.0 | 47.6 | 29.8 | 29.0 | 29.2 | 28.2 | 29.1 | 51.7 |
| | 35.0 | 50.4 | 51.1 | 51.7 | 51.9 | 53.4 | 54.9 | 55.4 |
| Without graphite | | | | | 93.2 | | | |

As can be seen from Tables 1 and 2, the voltage decrease rate after each quick charge is approximately the same as the voltage increase rate after quick discharge in the same solid-state voltage storage cell. Thus, the following description deals only with the voltage decrease rates listed in Table 1, but it is appreciated that the voltage increase rates (quick discharging characteristics) have substantially the same tendency as that of the voltage decrease rates (quick charging characteristics) which will be described below.

As shown in Table 1, when a voltage of 200 mV was applied for 10 seconds to the conventional solid-state voltage storage cell produced without graphite fibers, the voltage decrease rate was 92.5%. This indicates that when this voltage storage cell stores a voltage for a short period of time, the stored voltage greatly deviates from a given value.

On the other hand, the voltage decrease rates of the solid-state voltage storage cells of this example were all 60% or less. With the addition of graphite fibers to the electrode material, the quick charging characteristics of the solid-state voltage storage cell were improved. This indicates that the addition of graphite fibers improves the electron conductivity of the electrodes.

Figure 2:
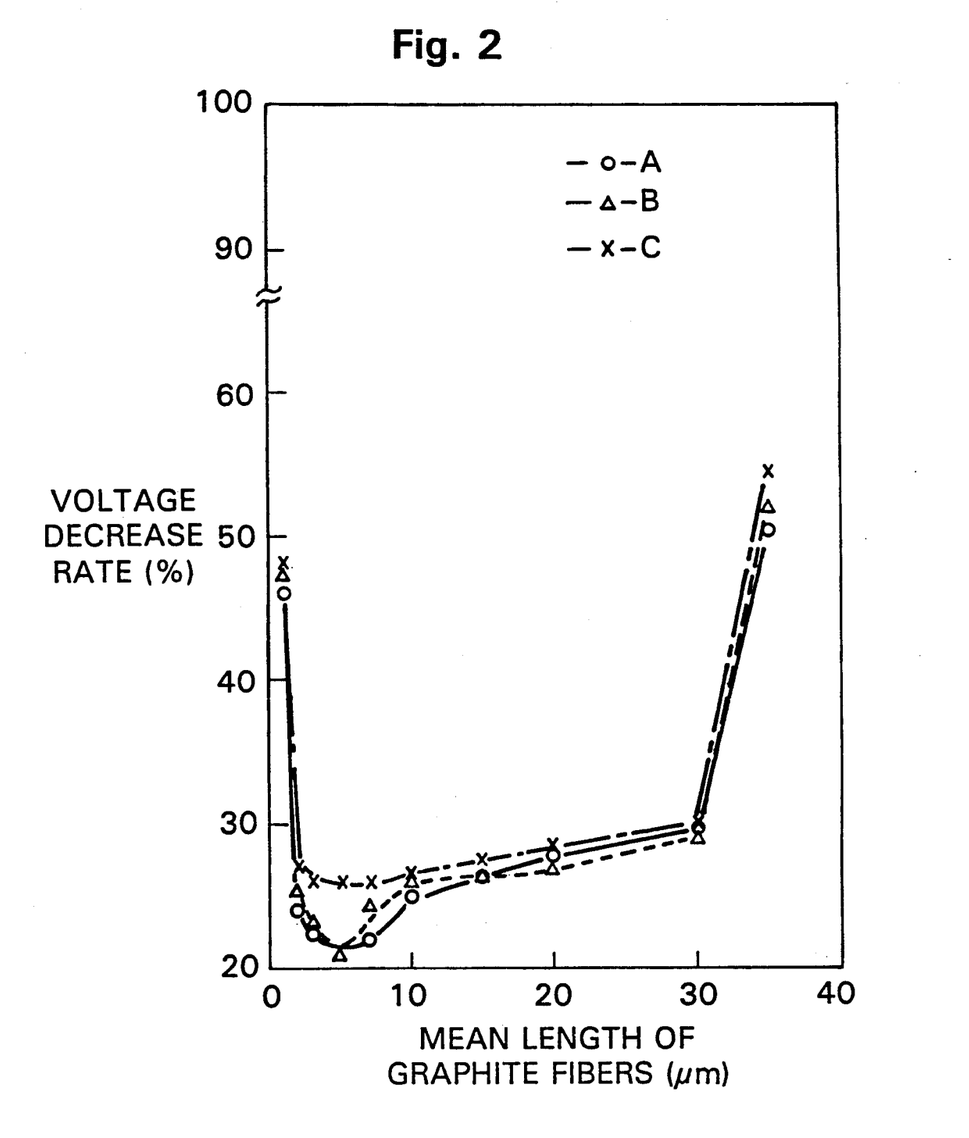
FIG. 2 is a graph showing the relationship between the mean length of graphite fibers and the voltage decrease rate after quick charge with respect to solid-state voltage storage cells A, B, and C of this invention.

Among the solid-state voltage cells shown in Table 1, those produced by the addition of graphite fibers with mean diameters of 0.1 $\mu$m, 0.3 $\mu$m, and 0.5 $\mu$m are referred to herein as cells A, B, and C, respectively. The relationship between the voltage decrease rate and the mean length of graphite fibers with respect to cells A, B, and C is shown in FIG. 2. As can be seen from this figure, with any of the mean diameters of 0.1 $\mu$m, 0.3 $\mu$m, and 0.5 $\mu$m, the voltage decrease rates were 30% or less, i.e., the quick charging characteristics were excellent when the mean length of the graphite fibers was within the range of 2 to 30 $\mu$m.

Figure 3:
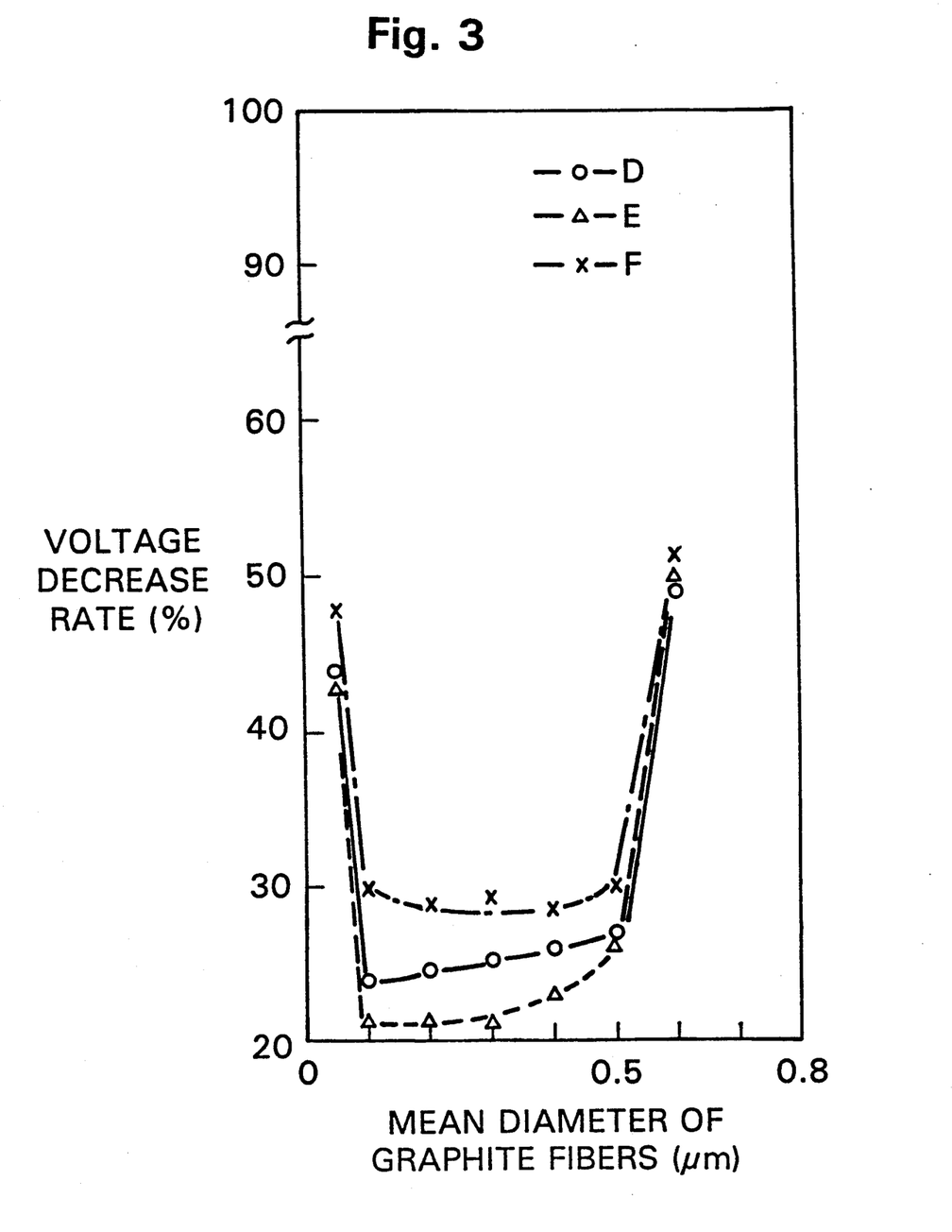
FIG. 3 is a graph showing the relationship between the mean diameter of the graphite fibers and the voltage decrease rate after quick discharge with respect to solid-state voltage storage cells D, E, and F of this invention.

Similarly, among the solid-state voltage cells shown in Table 1, those produced by the addition of graphite fibers with mean lengths of 2.0 $\mu$m, 5.0 $\mu$m, and 30.0 $\mu$m are referred to herein as cells D, E, and F, respectively. The relationship between the voltage decrease rate and the mean diameter of graphite fibers with respect to cells D, E, and F is shown in FIG. 3. As can be seen from this figure, with any of the mean lengths of 2.0 μm, 5.0 μm, and 30.0 μm, the voltage decrease rates were 30% or less, i.e., the quick charging characteristics were excellent when the mean diameter of the graphite fibers was within the range of 0.1 to 0.5 μm.

As described above, when the graphite fibers added to the electrode material have a mean diameter of 0.1 to 0.5 μm, and have a mean length of 2 to 30 μm, the quick charging characteristics of the solid-state voltage storage cell can be improved.

EXAMPLE 2

In this example, solid-state voltage storage cells were produced by the addition of different amounts of graphite fibers to the respective electrode materials.

The electrode active material of $Ag_{0.7}V_2O_5$ and the solid electrolyte of $4AgI-Ag_2W_4$ were prepared in the same manner as in Example 1. Using the electrode active material and the solid electrolyte, solid-state voltage storage cells were produced as follows.

First, the electrode active material and the solid electrolyte were mixed at a weight ratio of 3:7. Then, graphite fibers were added to the mixture, and the whole mixture was further mixed until it became uniform, resulting in an electrode material. In this example, various electrode materials were prepared by the addition of different amounts of graphite fibers as listed in Table 3 below. Also, four kinds of graphite fibers having different combinations of a mean diameter and a mean length as listed in Table 3 were used. The electrode materials were prepared by the addition of different amounts of each kind of graphite fibers.

Next, 25 mg of each electrode material thus obtained was weighed and formed into an electrode pellet of 7 mm in diameter by the application of 4 tons/cm² pressure. Two such electrode pellets were used for the production of a solid-state voltage storage cell. Then, 150 mg of the solid electrolyte also in the form of a pellet was disposed between the two electrode pellets, and the whole was formed into a pellet of 7 mm in diameter by the application of 4 tons/cm² pressure, resulting in a solid-state voltage storage cell.

As shown in Table 3, the solid-state voltage storage cells produced by the addition of graphite fibers with a mean diameter of 0.1 μm and a mean length of 2.0 μm are referred to herein as cells G, those produced by the addition of graphite fibers with a mean diameter of 0.1 μm and a mean length of 5.0 μm are referred to herein as cells H, those produced by the addition of graphite fibers with a mean diameter of 0.3 μm and a mean length of 10.0 μm are referred to herein as cells I, and those produced by the addition of graphite fibers with a mean diameter of 0.5 μm and a mean length of 30.0 μm are referred to herein as cells J.

For the evaluation of quick charging and discharging characteristics of the various solid-state voltage storage cells produced above, two tin-plated copper leads were respectively attached to the two electrodes of each voltage storage cell by the use of carbon paste, and then the whole was sealed by the application of an epoxy resin powder coating at a temperature of 150° C.

The quick charging and discharging characteristics of the solid-state voltage storage cells were evaluated in the same manner as in Example 1. It was also found in this example that the voltage decrease rate after each quick charge is approximately the same as the voltage increase rate after quick discharge. Thus, the following description deals only with the voltage decrease rates listed in Table 3.

TABLE 3

| | Voltage decrease rate after two hours (%) | | | |
|---|---|---|---|---|
| Graphite content in electrode (wt %) | Mean fiber diameter 0.1 μm Mean fiber length 2.0 μm (Cell G) | Mean fiber diameter 0.1 μm Mean fiber length 5.0 μm (Cell H) | Mean fiber diameter 0.3 μm Mean fiber length 10.0 μm (Cell I) | Mean fiber diameter 0.5 μm Mean fiber length 30.0 μm (Cell J) |
| 0.5 | 50.2 | 49.2 | 52.3 | 54.0 |
| 1.0 | 30.3 | 29.1 | 31.2 | 33.1 |
| 1.5 | 24.0 | 21.0 | 26.0 | 29.9 |
| 2.0 | 23.0 | 21.6 | 25.2 | 29.5 |
| 3.0 | 25.4 | 23.6 | 27.7 | 30.4 |
| 5.0 | 33.2 | 32.3 | 34.2 | 35.2 |
| 7.0 | 57.1 | 54.2 | 57.5 | 59.2 |
| 10.0 | 63.2 | 60.3 | 64.3 | 66.0 |

Figure 4:
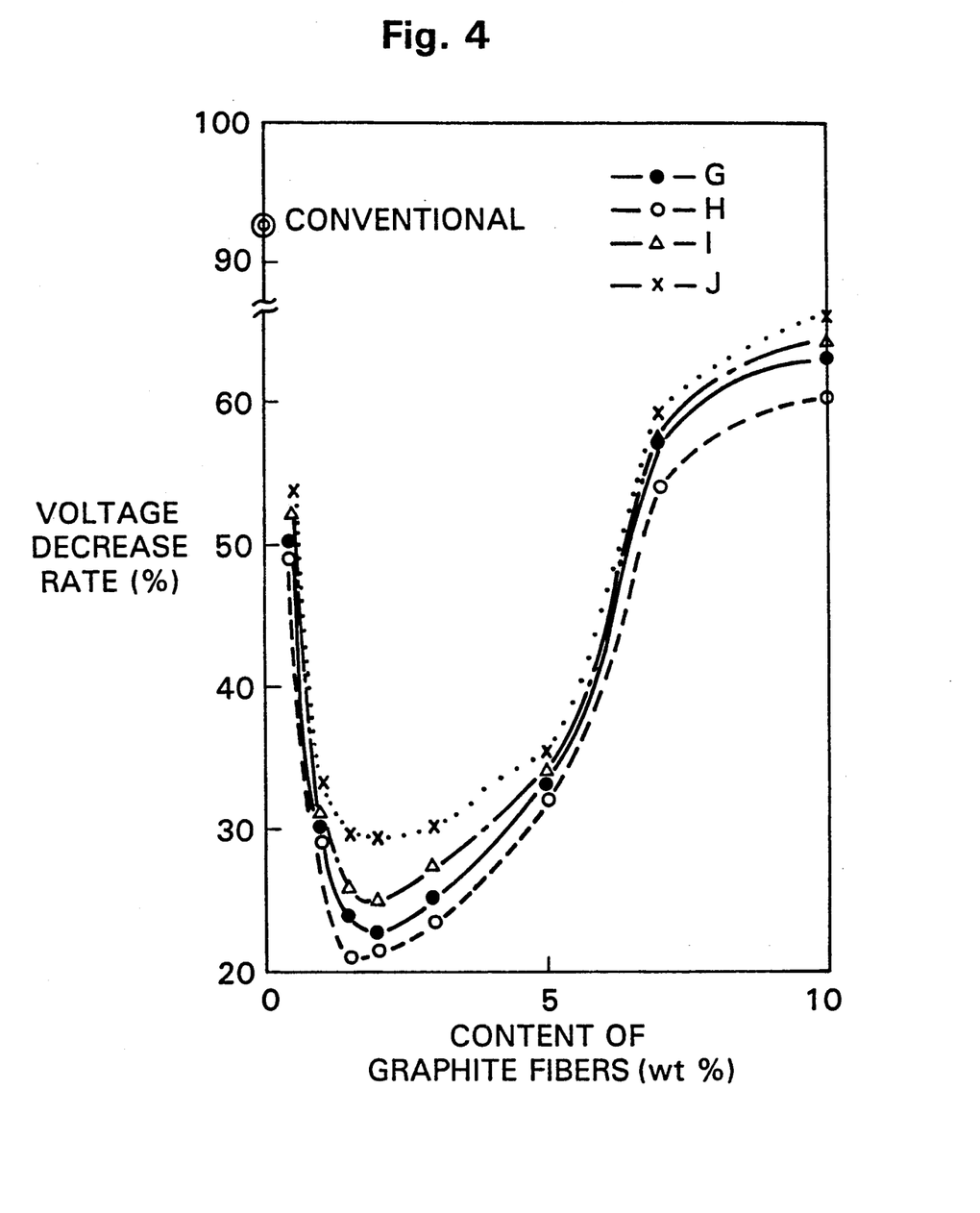
FIG. 4 is a graph showing the relationship between the content of graphite fibers and the voltage decrease rate after quick charge with respect to solid-state voltage storage cells G, H, I, and J of this invention, and a conventional voltage storage cell.

FIG. 4 shows the relationship between the voltage decrease rate and the content of graphite fibers with respect to cells G, H, I, and J. As can be seen from this figure, with the addition of graphite fibers at any content, the quick charging characteristics of cells G, H, I, and J were excellent, as compared with the conventional voltage storage cell produced without graphite fibers as described in Example 1. Although the optimum content of graphite fibers in the electrode material differs from one cell to another, all the cells G, H, I, and J exhibited excellent charging characteristics, i.e., voltage decrease rates of 40% or less, when the content of graphite fibers in the electrode material was within the range of 1 to 5 percent by weight.

EXAMPLE 3

In this example, the relationship between the duration of charge and the voltage decrease rate was examined. The content of graphite fibers in the electrode material was set at 1.5 percent by weight which was within the preferred range found in Example 2.

The electrode active material of $Ag_{0.7}V_2O_5$ and the solid electrolyte of $4AgI-Ag_2W_4$ were prepared in the same manner as in Example 1. Using the electrode active material and the solid electrolyte, solid-state voltage storage cells were produced as follows.

First, the electrode active material and the solid electrolyte were mixed at a weight ratio of 3:7. Then, graphite fibers were added to the mixture, and the whole mixture was further mixed until it became uniform, resulting in an electrode material. In this example, various electrode materials were prepared by the addition of four kinds of graphite fibers as shown in Table 4 below. The four kinds of graphite fibers had different combinations of a mean diameter and a mean length both within the preferred ranges found in Example 1.

Next, 25 mg of each electrode material thus obtained was weighed and formed into an electrode pellet of 7 mm in diameter by the application of tons/cm² pressure. Two such electrode pellets were used for the production of a solid-state voltage storage cell. Then, 150 mg of the solid electrolyte also in the form of a pellet was disposed between the two electrode pellets, and the whole was formed into a pellet of 7 mm in diameter by the application of tons/cm² pressure, resulting in a solid-state voltage storage cell.

As shown in Table 4, four kinds of solid-state voltage storage cells K, L, M, and N were produced by the addition of graphite fibers with different combinations of a mean diameter and a mean length. Cell K was produced by the addition of graphite fibers with a mean diameter of 0.1 μm and a mean length of 2.0 μm, cell L was produced by the addition of graphite fibers with a mean diameter of 0.1 μm and a mean length of 5.0 μm, cell M was produced by the addition of graphite fibers with a mean diameter of 0.3 μm and a mean length of 10.0 μm, and cell N was produced by the addition of graphite fibers with a mean diameter of 0.5 μm and a mean length of 30.0 μm. Moreover, a conventional solid-state voltage storage cell was produced in the same manner as described above, except that no graphite fibers were added to the electrode material.

For the evaluation of quick charging and discharging characteristics of the various solid-state voltage storage cells thus produced, two tin-plated copper leads were respectively attached to the two electrodes of each voltage storage cell by the use of carbon paste, and then the whole was sealed by the application of an epoxy resin powder coating at a temperature of 150° C.

The quick charging and discharging characteristics of the solid-state voltage storage cells were evaluated in the same manner as in Example 1, except that the duration of each charge was set at 10, 30, 60, 600, or 7200 seconds.

It was also found in this example that the voltage decrease rate after each quick charge is approximately the same as the voltage increase rate after quick discharge in the same voltage storage cell. Thus, the following description deals only with the voltage decrease rate listed in Table 4.

charged only for 10 seconds to attain a voltage decrease rate of 20 to 30%.

EXAMPLE 4

In this example, graphite scales were used in place of graphite fibers for the preparation of electrode materials.

The electrode active material of $Ag_{0.7}V_2O_5$ and the solid electrolyte of $4AgI-Ag_2W_4$ were prepared in the same manner as in Example 1. Using the electrode active material and the solid electrolyte, solid-state voltage storage cells were produced as follows.

First, the electrode active material and the solid electrolyte were mixed at a weight ratio of 3:7. Then, 2.0 percent by weight of graphite in the form of scales was added to the mixture, and the whole mixture was further mixed until it became uniform, resulting in an electrode material. The graphite scales were electrochemically inactive with the $Ag_{0.7}V_2O_5$. In this example, various electrode materials were prepared by the addition of graphite fibers with different mean diameters as listed in Table 5 below.

Then, 25 mg of each electrode material thus obtained was weighed and formed into an electrode pellet of 7 mm in diameter by the application of 4 tons/cm² pressure Two such electrode pellets were used for the production of a solid-state voltage storage cell. Then, 150 mg of the solid electrolyte also in the form of a pellet was disposed between the two electrode pellets, and the whole was formed into a pellet of 7 mm in diameter by the application of 4 tons/cm² pressure, resulting in a solid-state voltage storage cell.

TABLE 4

| | Voltage decrease rate after two hours (%) | | | | |
|---|---|---|---|---|---|
| Duration of charge (sec) | Without graphite | Mean fiber diameter 0.1 μm Mean fiber length 2.0 μm (Cell K) | Mean fiber diameter 0.1 μm Mean fiber length 5.0 μm (Cell L) | Mean fiber diameter 0.3 μm Mean fiber length 10.0 μm (Cell M) | Mean fiber diameter 0.5 μm Mean fiber length 30.0 μm (Cell N) |
| 7200 | 5.1 | 2.1 | 1.2 | 2.4 | 3.1 |
| 600 | 15.3 | 4.2 | 3.9 | 4.7 | 4.9 |
| 60 | 41.8 | 24.1 | 21.5 | 24.3 | 26.0 |
| 30 | 65.3 | 23.8 | 21.6 | 25.2 | 27.9 |
| 10 | 92.5 | 24.0 | 21.0 | 26.0 | 29.9 |

Figure 5:
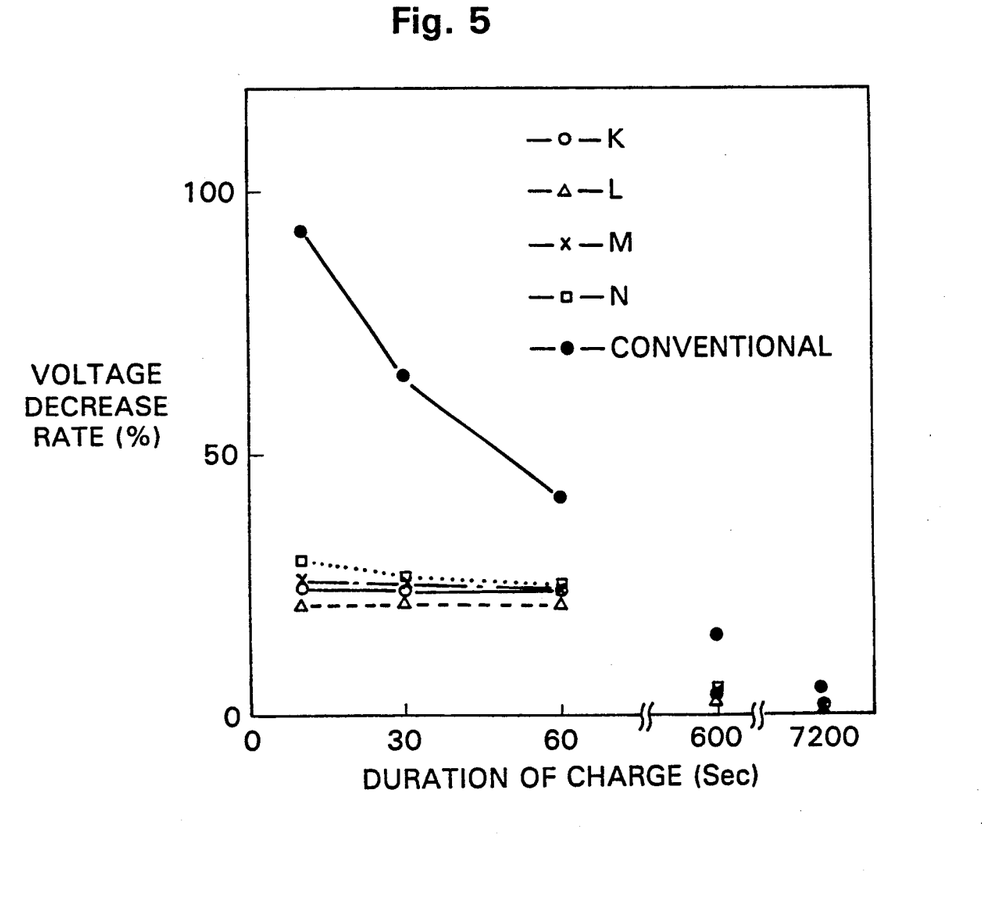
FIG. 5 is a graph showing the relationship between the duration of quick charge and the voltage decrease rate after the quick charge with respect to solid-state voltage storage cells K, L, M, and N of this invention, and a conventional voltage storage cell.

FIG. 5 shows the relationship between the voltage decrease rate and the duration of charge with respect to cells K, L, M, and N. As can be seen from this figure, cells K, L, M, and N of this example were excellent in quick charging characteristics, as compared with the conventional voltage storage cell produced without graphite fibers. In the conventional cell, a decrease in the duration of the charge caused a rapid increase in the voltage decrease rate.

On the other hand, in the cells prepared by the addition of graphite fibers, e.g., in cell K, the voltage decrease rate measured after charging the cell for 10 seconds was substantially the same as that measured after charging it for 60 seconds. Cell K exhibited excellent quick charging characteristics in the case where the duration of charge was set at 10 seconds as well as at 60 seconds.

As described above, by the addition of graphite fibers to the electrode material, the voltage decrease rate measured after charging the cell for 10 seconds can be made approximately the same as that measured after charging it for 60 seconds. The solid-state voltage storage cell produced with graphite fibers is required to be For the evaluation of quick charging and discharging characteristics of the various solid-state voltage storage cells produced above, two tin-plated copper leads were respectively attached to the two electrodes of each voltage storage cell by the use of carbon paste, and then the whole was sealed by the application of epoxy resin powder coating at a temperature of 150° C.

The quick charging characteristics of the solid-state voltage storage cells were evaluated as follows.

A voltage of 200 mV was applied to each solid-state voltage storage cell for 10 seconds at a temperature of 20° C. without using any protective resistor. Then, the solid-state voltage storage cell was maintained under the condition of an open circuit for 2 hours, which was the time required for the voltage of the cell to become substantially stable. After 2 hours passed, the terminal voltage of the cell was measured. The ratio of the cell voltage decrease to the charging voltage was defined as "voltage decrease rate", which was used as an index for the evaluation of the quick charging characteristics of the solid-state voltage storage cell.

The quick discharging characteristics of the solid-state voltage storage cells were evaluated as follows.

First, a voltage of 200 mV was applied to each solid-state voltage storage cell for 20 hours at a temperature of 20° C. without using any protective resistor. Thereafter, the cell was discharged for 10 seconds with a discharging resistor of 0 Ω (i.e., with the cell terminals being short-circuited). After discharge, the voltage storage cell was maintained under the condition of an open circuit for 2 hours, which was the time required for the voltage of the cell to become substantially stable. After 2 hours passed, the terminal voltage was measured. The ratio of this cell voltage to the charging voltage was defined as "voltage increase rate", which was used as an index for the evaluation of the quick discharging characteristics of the solid-state voltage storage cell.

The results of the evaluation of the quick charging and discharging characteristics of all the solid-state voltage storage cells (i.e., voltage increase and decrease rates) are shown in Table 5, with respect to the mean diameters of the graphite scales contained in the electrode material of the cells. Each value listed in Table 5 is the average of the voltage increase or decrease rates of fifty solid-state voltage storage cells produced with use of the same electrode materials (i.e., the electrode materials containing graphite scales of the same mean diameter).

TABLE 5

| Mean diameter of graphite scales (μm) | Voltage decrease rate after two hours (%) | Voltage increase rate after two hours (%) |
| --- | --- | --- |
| 0.5 | 59.6 | 58.9 |
| 1.0 | 42.3 | 42.5 |
| 3.0 | 40.8 | 40.5 |
| 5.0 | 42.3 | 42.9 |
| 7.0 | 43.9 | 44.3 |
| 10.0 | 45.8 | 45.3 |
| 15.0 | 47.1 | 47.3 |
| 20.0 | 66.0 | 65.1 |

As can be seen from Table 5, the voltage decrease rate after each quick charge is approximately the same as the voltage increase rate after quick discharge in the same solid-state voltage storage cell. Thus, the following description deals only with the voltage decrease rates, but it is appreciated that the voltage increase rates (quick discharging characteristics) have substantially the same tendency as that of the voltage decrease rates (quick charging characteristics) which will be described below.

As described in Example 1, when a voltage of 200 mV was applied for 10 seconds to the conventional solid-state voltage storage cell produced without graphite fibers, the voltage decrease rate was 92.5%. This indicates that when this voltage storage cell stores a voltage for a short period of time, the stored voltage greatly deviates from a given value.

On the other hand, the voltage decrease rates of the solid-state voltage storage cells of this example were all 65% or less, as shown in Table 5. With the addition of graphite scales to the electrode material, the quick charging characteristics of the solid-state voltage storage cell were improved. This indicates that the addition of graphite scales improves the electron conductivity of the electrodes.

Figure 6:
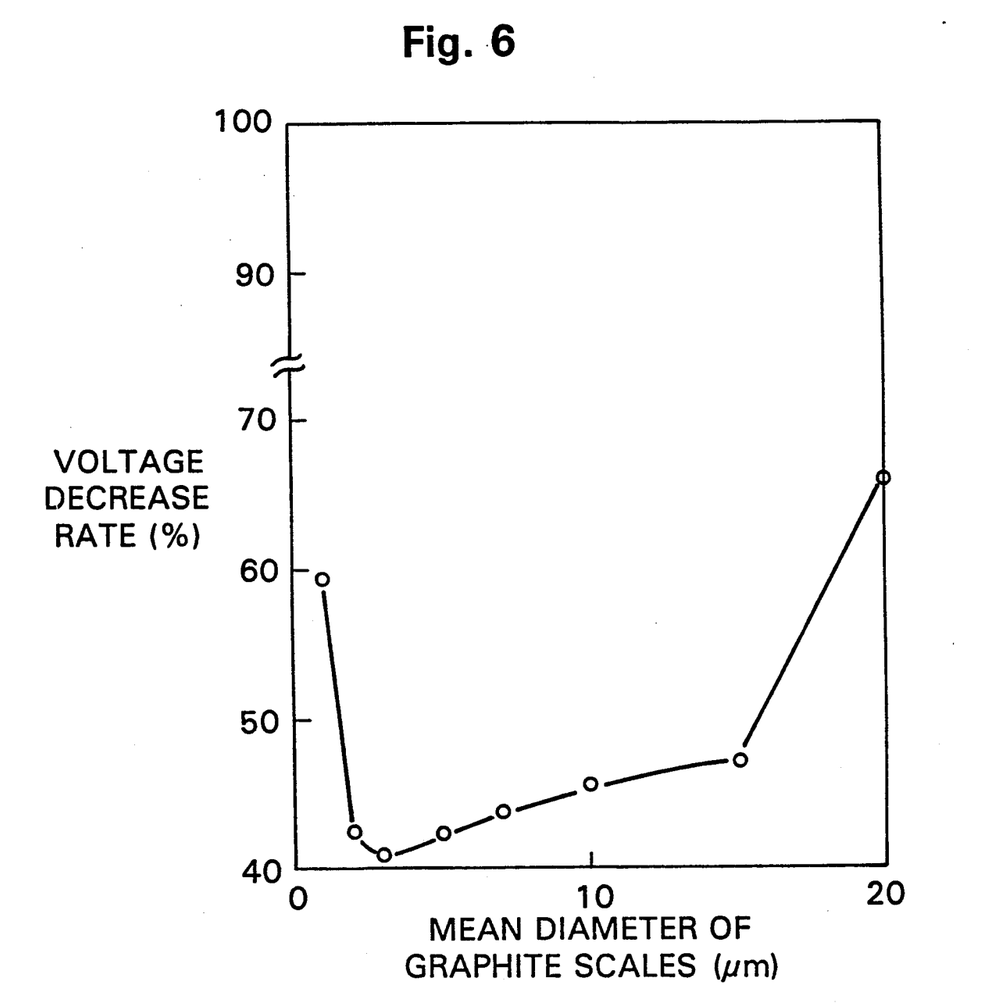
FIG. 6 is a graph showing the relationship between the mean diameter of graphite scales and the voltage decrease rate after quick charge with respect to a solid-state voltage storage cell of this invention

FIG. 6 shows the relationship between the voltage decrease rates and the mean diameters of graphite scales in the cells shown in Table 5. As can be seen from FIG. 6, when graphite scales with a mean diameter of 1.0 to 15 μm were used, the voltage decrease rate was 50% or less. Thus, when the mean diameter of graphite scales contained in the electrodes was within the range of 1.0 to 15 μm, the quick charging characteristics of the cell were improved.

EXAMPLE 5

In this example, solid-state voltage storage cells were produced by the addition of different amounts of graphite scales to the respective electrode materials.

The electrode active material of $Ag_{0.7}V_2O_5$ and the solid electrolyte of $4AgI\text{-}Ag_2W_4$ were prepared in the same manner as in Example 1. Using the electrode active material and the solid electrolyte, solid-state voltage storage cells were produced as follows.

First, the electrode active material and the solid electrolyte were mixed at a weight ratio of 3:7. Then, graphite scales were added to the mixture, and the whole mixture was further mixed until it became uniform, resulting in an electrode material. In this example, various electrode materials were prepared by the addition of different amounts of graphite scales as listed in Table 6 below. Also, four kinds of graphite scales having different mean diameters as shown in Table 6 were used. The electrode materials were prepared by the addition of different amounts of each kind of graphite scales.

Next, 25 mg of each electrode material thus obtained was weighed and formed into an electrode pellet of 7 mm in diameter by the application of 4 tons/cm² pressure. Two such electrode pellets were used for the production of a solid-state voltage storage cell. Then, 150 mg of the solid electrolyte also in the form of a pellet was disposed between the two electrode pellets, and the whole was formed into a pellet of 7 mm in diameter by the application of 4 tons/cm² pressure, resulting in a solid-state voltage storage cell.

As shown in Table 6, the solid-state voltage storage cells produced by the addition of graphite scales with a mean diameter of 1.0 μm are referred to herein as cells O, those produced by the addition of graphite scales with a mean diameter of 3.0 μm are referred to as cells P, those produced by the addition of graphite scales with a mean diameter of 7.0 μm are referred to as cells Q, and those produced by the addition of graphite scales with a mean diameter of 15.0 μm are referred to as cells R.

For the evaluation of quick charging and discharging characteristics of the various solid-state voltage storage cells produced above, two tin-plated copper leads were respectively attached to the two electrodes of each voltage storage cell by the use of carbon paste, and then the whole was sealed by the application of an epoxy resin powder coating at a temperature of 150° C.

The quick charging and discharging characteristics of the solid-state voltage storage cells were evaluated in the same manner as in Example 4. It was also found in this example that the voltage decrease rate after each quick charge is approximately the same as the voltage increase rate after quick discharge. Thus, the following description deals only with the voltage decrease rates listed in Table 6.

TABLE 6

| Graphite content in electrode (wt %) | Voltage decrease rate after two hours (%) | | | |
|---|---|---|---|---|
| | Mean diameter 1.0 μm (Cell O) | Mean diameter 3.0 μm (Cell P) | Mean diameter 7.0 μm (Cell Q) | Mean diameter 15 μm (Cell R) |
| 0.5 | 59.8 | 59.2 | 59.8 | 56.0 |
| 1.0 | 49.5 | 48.7 | 47.9 | 49.8 |
| 2.0 | 42.3 | 40.3 | 43.9 | 47.1 |
| 3.0 | 43.8 | 40.0 | 42.2 | 45.0 |
| 5.0 | 49.5 | 46.8 | 48.0 | 49.9 |
| 7.0 | 57.9 | 57.0 | 56.0 | 59.3 |
| 10.0 | 66.8 | 68.0 | 65.0 | 68.9 |

Figure 7:
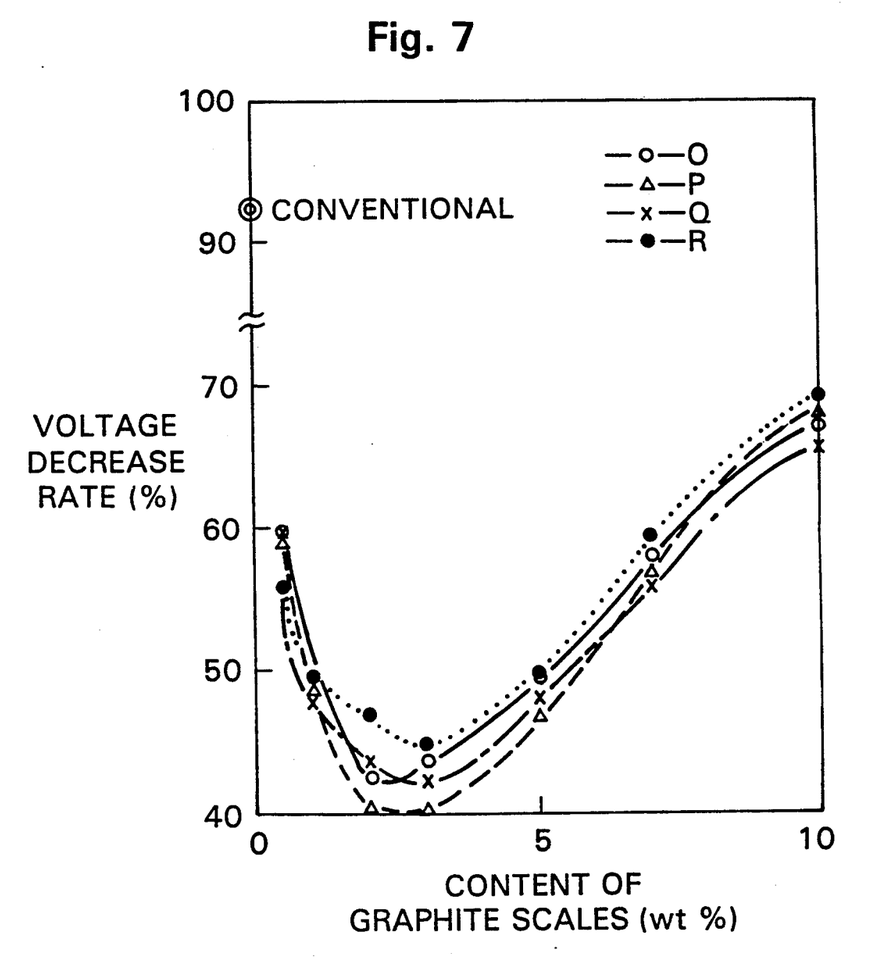
FIG. 7 is a graph showing the relationship between the content of graphite scales and the voltage decrease rate after quick charge with respect to solid-state voltage storage cells O, P, Q, and R of this invention, and a conventional voltage storage cell.

FIG. 7 shows the relationship between the voltage decrease rate and the content of graphite scales in cells O, P, Q, and R. As can be seen from this figure, with the addition of graphite scales at any content, the quick charging characteristics of cells O, P, Q, and R were excellent, as compared with the conventional voltage storage cell produced without graphite fibers as described in Example 1. Although the optimum content of graphite scales in the electrode material differs from one cell to another, all the cells O, P, Q, and R exhibited excellent quick charging characteristics, i.e., voltage decrease rates of 50% or less, when the content of graphite scales in the electrode material was within the range of 1 to 5 percent by weight.

EXAMPLE 6

In this example, the relationship between the duration of charge and the voltage decrease rate was examined. The content of graphite scales in the electrode material was set at 2.0 percent by weight which was within the preferred range found in Example 5.

The electrode active material of $Ag_{0.7}V_2O_5$ and the solid electrolyte of $4AgI\text{-}Ag_2W_4$ were prepared in the same manner as in Example 1. Using the electrode active material and the solid electrolyte, solid-state voltage storage cells were produced as follows.

First, the electrode active material and the solid electrolyte were mixed at a weight ratio of 3:7. Then, graphite scales were added to the mixture, and the whole mixture was further mixed until it became uniform, resulting in an electrode material. In this example, various electrode materials were prepared by the addition of four kinds of graphite scales as listed in Table 7 below. The four kinds of graphite scales had different mean diameters each within the preferred range found in Example 4.

Then, 25 mg of each electrode material thus obtained was weighed and formed into an electrode pellet of 7 mm in diameter by the application of 4 tons/cm² pressure. Two such electrode pellets were used for the production of a solid-state voltage storage cell. Then, 150 mg of the solid electrolyte also in the form of a pellet was disposed between the two electrode pellets, and the whole was formed into a pellet of 7 mm in diameter by the application of 4 tons/cm² pressure, resulting in a solid-state voltage storage cell.

As shown in Table 7, in this example, four kinds of solid-state voltage storage cells S, T, U, and V were produced by the addition of graphite scales with mean diameters of 1.0 μm, 3.0 μm, 7.0 μm, and 15 μm, respectively. For comparison, a conventional solid-state voltage storage cell was produced in the same manner as described above, except that no graphite scales were added to the electrode material.

For the evaluation of quick charging and discharging characteristics of the various solid-state voltage storage cells produced above, two tin-plated copper leads were respectively attached to the two electrodes of each voltage storage cell by the use of carbon paste, and then the whole was sealed by the application of an epoxy resin powder coating at a temperature of 150° C.

The quick charging and discharging characteristics of the solid-state voltage storage cells were evaluated in the same manner as in Example 4, except that the duration of each charge was set at 10, 30, 60, 600, or 7200 seconds.

In the same manner as in Example 1, the voltage decrease rate after each quick charge was approximately the same as the voltage increase rate after quick discharge in the same voltage storage cell. Thus, the following description deals only with the voltage decrease rates listed in Table 7.

TABLE 7

| Duration of charge (sec) | Voltage decrease rate after two hours (%) | | | | |
|---|---|---|---|---|---|
| | Without graphite | Mean diameter 1.0 μm (Cell S) | Mean diameter 3.0 μm (Cell T) | Mean diameter 7.0 μm (Cell U) | Mean Diameter 15 μm (Cell V) |
| 7200 | 5.1 | 1.9 | 2.1 | 2.5 | 2.9 |
| 600 | 15.3 | 4.5 | 4.2 | 3.9 | 4.8 |
| 60 | 41.8 | 22.0 | 23.5 | 25.3 | 27.3 |
| 30 | 65.3 | 33.9 | 33.0 | 37.1 | 35.8 |
| 10 | 92.5 | 42.3 | 40.3 | 43.9 | 47.1 |

Figure 8:
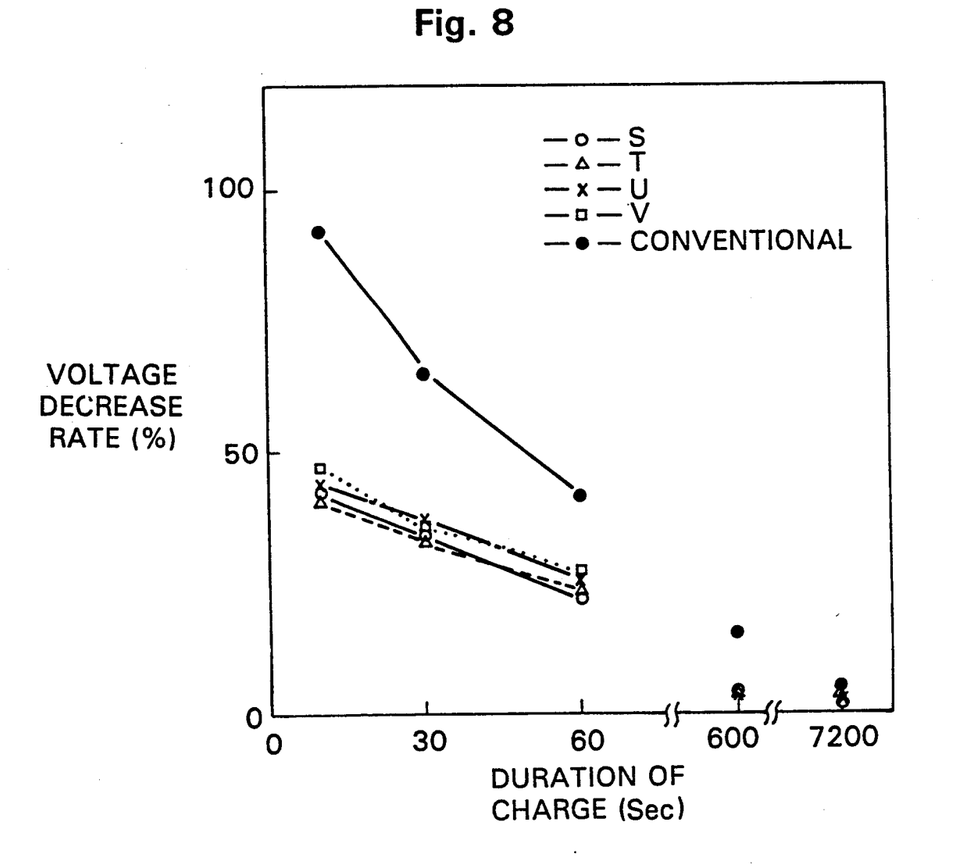
FIG. 8 is a graph showing the relationship between the duration of quick charge and the voltage decrease rate after the quick charge with respect to solid-state voltage storage cells S, T, U, and V of this invention, and a conventional voltage storage cell.

FIG. 8 shows the relationship between the voltage decrease rate and the duration of charge in cells S, T, U, and V. As can be seen from this figure, cells S, T, U, and V of this example were excellent in quick charging characteristics, as compared with the conventional voltage storage cell produced without graphite scales.

In the conventional cell, a decrease in the duration of charge caused a rapid increase in the voltage decrease rate. On the other hand, in the cells produced with graphite scales, e.g., in cell S, the voltage decrease rate measured after charging the cell for 10 seconds was far lower, as compared with the conventional cell produced for comparison. In the case where the duration of the charge was set at 60 seconds, cell S exhibited approximately the same voltage decrease rate as those of the cells produced with graphite fibers of Examples 1 to 3. This indicates that cell S has excellent quick charging characteristics when charged for 60 seconds.

The solid-state voltage storage cell produced with graphite scales provides a voltage decrease rate of about 40% when charged for 10 seconds. In cases where the duration of charge is set at less than 60 seconds, e.g., 10 seconds, the solid-state voltage storage cells produced with graphite fibers of Examples 1 to 3 exhibit better quick charging characteristics, as compared with the cells of this example.

It is understood that various other modifications will be apparent to and can readily be made by those skilled in the art without departing from the scope and spirit of this invention. Accordingly, it is not intended that the scope of the claims appended hereto be limited to the description as set forth herein, bet rather that the claims be construed as encompassing all the features of patentable novelty that reside in the present invention, including all features that would be treated as equivalents thereof by those skilled in the art to which this invention pertains.

What is claimed is:

1. A solid-state voltage storage cell comprising a pair of electrodes and a silver-ion conductive solid electrolyte layer disposed therebetween, each of the electrodes containing a silver-ion conductive solid electrolyte, a compound oxide of the formula $Ag_xV_2O_5$ ($0.6 \leq x \leq 0.8$) as an electrode active material, and graphite fibers as electron conductive materials, the graphite fibers having a mean diameter in the range of 0.1 to 0.5 μm and having a mean length in the range of 2 to 30 μm.

2. A solid-state voltage storage cell according to claim 1, wherein the content of graphite fibers in each of the electrodes is in the range of 1 to 5 percent by weight based on the total weight of the electrodes.

3. A solid-state voltage storage cell comprising a pair of electrodes and a silver-ion conductive solid electrolyte layer disposed therebetween, each of the electrodes containing a silver-ion conductive solid electrolyte, a compound oxide of the formula $Ag_xV_2O_5$ ($0.6 \leq x \leq 0.8$) as an electrode active material, and graphite scales as electron conductive materials, the graphite scales having a mean diameter in the range of 1 to 15 μm.

4. A solid-state voltage storage cell according to claim 3, wherein the content of graphite scales in each of the electrodes is in the range of 1 to 5 percent by weight based on the total weight of the electrode.

* * * * *